United States Patent [19]
Nishida

[11] Patent Number: 5,313,528
[45] Date of Patent: May 17, 1994

[54] METHOD FOR EXTRACTING FEATURES FROM ON-LINE HANDWRITTEN CHARACTERS

[75] Inventor: Hirobumi Nishida, Sagamihara, Japan

[73] Assignee: Ricoh Company, Ltd., Tokyo, Japan

[21] Appl. No.: 797,051

[22] Filed: Nov. 25, 1991

[30] Foreign Application Priority Data

Nov. 29, 1990 [JP] Japan ................... 2-332591

[51] Int. Cl.$^5$ ............................ G06K 9/46; G06K 9/50
[52] U.S. Cl. ......................................... 382/23; 382/16; 382/24
[58] Field of Search ...................... 382/13, 16, 19, 20, 382/21, 23, 24, 36

[56] References Cited

U.S. PATENT DOCUMENTS

| | | | |
|---|---|---|---|
| 3,863,218 | 1/1975 | Oka et al. | 382/21 |
| 4,173,753 | 11/1979 | Chou | 382/24 |
| 4,607,386 | 8/1986 | Morita et al. | 382/13 |
| 4,680,804 | 7/1987 | Kuzunuki et al. | 382/13 |
| 4,685,142 | 8/1987 | Ooi et al. | 382/13 |
| 4,718,102 | 1/1988 | Crane et al. | 382/13 |
| 4,718,103 | 1/1988 | Shojima et al. | 382/13 |
| 5,034,989 | 7/1991 | Loh | 382/13 |

OTHER PUBLICATIONS

Charles C. Tappert et al, "The State of the Art in On-Line Handwriting Recognition," *IEEE Transactions on Pattern Analysis and Machine Intelligence*, vol. 12, No. 8, Aug. 1990, pp. 787–808.

Y. Sugishita, "On Line Handwriting Recognition for Kanji Characters in which Restrictions in Writing, such as a Restriction Regarding Simplified Characters Are Eased", *Nikki Electronics*, No. 331, Dec. 5, 1983, pp. 115–133.

Primary Examiner—Michael T. Razavi
Assistant Examiner—David Fox
Attorney, Agent, or Firm—Mason, Fenwick & Lawrence

[57] ABSTRACT

A method provides for extracting features from a handwritten character which is input to an on-line input device. The on-line input device successively outputs stroke information indicating points on strokes of the handwritten character. The method includes a first step of detecting strokes of the handwritten character based on the stroke information. Thereafter, singular points are detected, based on the stroke information. Each of the singular points is defined as a pair of points on the strokes of the handwritten character which are written at different times but have substantially the same coordinates. Then, primitive sequences forming each of the strokes are obtained, and a connective relationship between each two formative sequences of each of the strokes is determined. Finally, the structure of each of the singular points is determined.

4 Claims, 12 Drawing Sheets

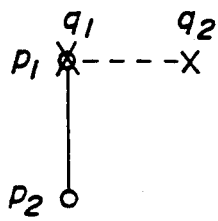
FIG. 5(a)
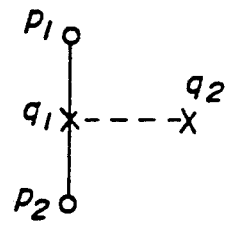
FIG. 5(b)
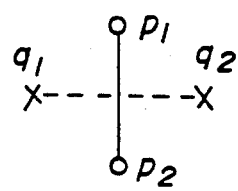
FIG. 5(c)
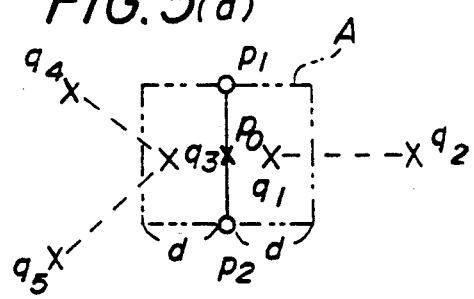
FIG. 5(d)
FIG. 6(a)
head tail
FIG. 6(b)
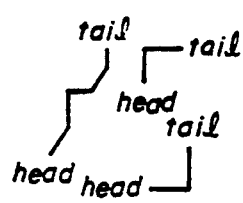
FIG. 6(c)
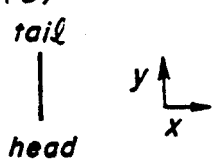
FIG. 6(d)
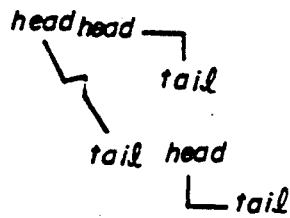

[/, head, \, tail]

[|, head, \, tail]

[/, head, |, head]

[/, head, /, head]

[\,head,/,head]

[−,head,/,head]

[\,head,−,head]

[\,head,\,head]

[ /, tail, \, head ]

[ |, tail, \, head ]

[ /, tail, |, tai ]

[ /, tail, /, tail ]

[\, tail, /, tail]

[−, tail, /, tail]

[\, tail, −, tail]

[\, tail, \, tail]

$E_0$ $E_1$

METHOD FOR EXTRACTING FEATURES FROM ON-LINE HANDWRITTEN CHARACTERS

BACKGROUND OF THE INVENTION (1) Field of the invention

The present invention generally relates to a method for extracting features from characters which is applied to a character recognition system, and more particularly to a method for extracting features from an on-line handwritten character.

(2) Description of related art

In an on-line handwriting recognition system, when an operator writes a character on a digitizing tablet, the character (an on-line handwritten character) is recognized based on coordinate data output from the digitizing tablet. The on-line handwriting recognition system has been studied for a long time. However, since the on-line handwritten character can have various shapes, it is difficult to accurately recognize the on-line handwritten character.

A conventional on-line handwriting recognition method is disclosed, for example, in Yoko Suminaga, "On-line handwriting recognition for Kanji characters easing restrictions of writing, such as a restriction regarding simplified characters" (NIKKEI ELECTRONICS, 331, pp. 115-133, Dec. 5, 1983). In this conventional on-line handwriting recognition method, the on-line handwritten character which can have various shapes is recognized by use of many features describing shapes of characters. However, as these features are adhoc determined, there is a disadvantage in that it requires a great deal of labor to make a dictionary regarding character shapes. Further, although the on-line handwriting recognition method requires an effective and high speed matching process, in the conventional on-line handwriting recognition method, a dynamic programming in which complex calculations are carried out is used to distinguish many different shapes of a character from each other. In addition, in a case where characters are recognized by use of a structural technique, as the structural technique greatly depends on a writing stroke order of each character, there is a disadvantage in that it requires a large-scale dictionary to recognize characters which can have various shapes, such as Kanji characters.

SUMMARY OF THE INVENTION

Accordingly, a general object of the present invention is to provide a novel and useful method for extracting features from an on-line handwritten character in which the disadvantages of the aforementioned prior art are eliminated.

A more specific object of the present invention is to provide a method for extracting features from an on-line handwritten character capable of extracting features which can be used to effectively easily recognize an on-line handwritten character which can have various shapes and be written in various writing stroke orders.

The above objects of the present invention are achieved by a method for extracting features from a character which is input to an on-line input means by writing the character by hand, the on-line input means successively outputting stroke information indicating points on strokes of the handwritten character, and the method comprising the steps of: (a) detecting strokes of the handwritten character based on the stroke information output from the on-line input means; (b) detecting singular points from the points on the strokes of the handwritten character based on the stroke information output from the on-line input means, each of the singular points being defined as a pair of points on the strokes of the handwritten character, which points are written at different times and have substantially the same coordinates as each other; (c) obtaining primitive sequences forming each of the strokes detected by the step (a), each of the primitive sequences being formed of primitives and each of the primitives being a monotone curve, the monotone curve being a curve which is either non-increasing or non-decreasing; (d) determining a connective relationship between each two primitive sequences of each of the strokes; and (e) determining a structure of each of the singular points detected by the step (b) based on primitive sequences including each of the singular points and a coupling of the primitive sequences including each of the singular points, whereby the connective relationship determined by step (d) and the structure of each of the singular points determined by step (e) are obtained as feature data.

According to the present invention, as the structure of the on-line input character is described by use of connective relationships between the primitive sequences and the structure of each of the singular points, it is possible to extract features which can be used to effectively easily recognize an on-line handwritten character which can have various shapes and be written in various writing stroke orders.

Additional objects, features and advantages of the present invention will become apparent from the following detailed description when read in conjunction with the accompanying drawings.

BRIEF DESCRIPTION OF THE DRAWINGS

FIGS. 5a-5d are diagrams illustrating cases in which a singular point can be detected.

FIGS. 6a-6d are diagrams illustrating four types of primitives.

DESCRIPTION OF THE PREFERRED EMBODIMENTS

A description will now be given of an embodiment of the present invention.

Figure 1:
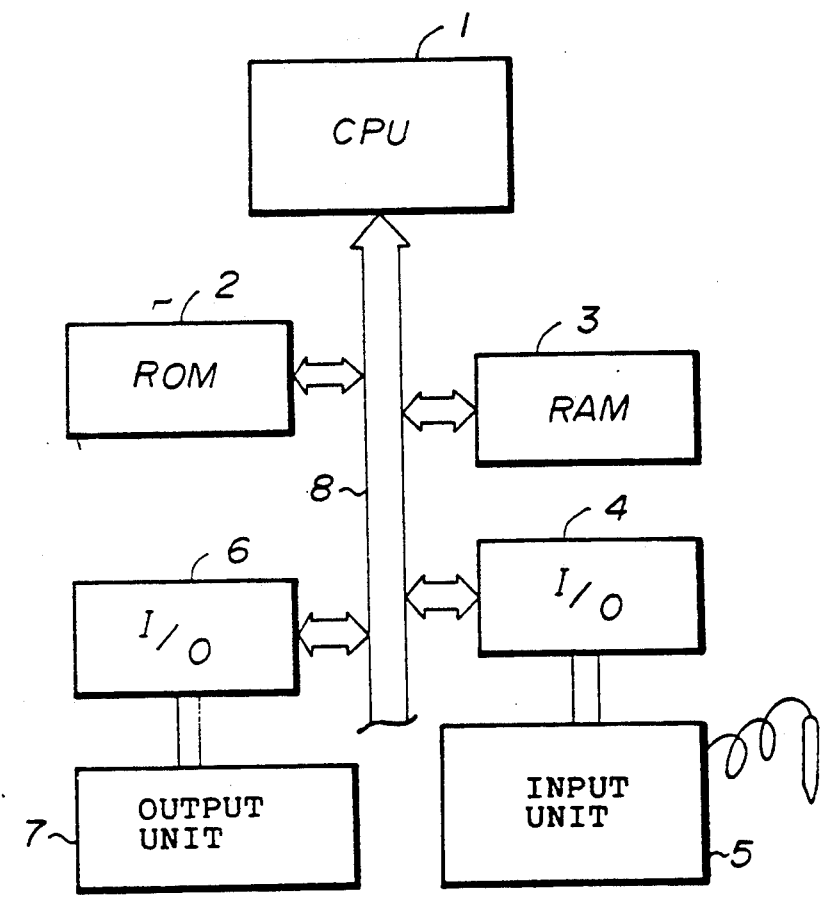
FIG. 1 is a block diagram illustrating an on-line handwriting recognition system.

Referring to FIG. 1, which shows a basic configuration of an on-line handwriting recognition system, the on-line handwriting recognition system has a CPU 1 (Central Processing Unit), a ROM 2 (Read Only Memory), a RAM 3 (Random Access Memory), an interface 4 to which an input unit 5 such as a digitizing tablet is connected, and an interface 6 to which an output unit 7 including a display unit, a printer and so on are connected. The CPU 1, the ROM 2, the RAM 3, and the interfaces 4 and 6 are respectively connected to each other by a system bus 8. The CPU 1 processes data in accordance with programs which are stored in the ROM 2. Data generated by the processing of the CPU 1 is stored in the RAM 3. An area used for an on-line handwriting recognition process is formed in the RAM 3. While an operator is writing a character on the digitizing tablet (the input unit 4), the digitizing tablet successively outputs coordinate data of sampled points on strokes of the character written thereon. The coordinate data output from the digitizing tablet is supplied via the interface 4 and the system bus 8 to the CPU 1. The CPU 1 carries out a first process for extracting features from the character based on the coordinate data and a second process for recognizing the character based on the features obtained by the first process. The recognition results obtained by the second process are supplied from the CPU 1 via the system bus 8 and the interface 6 to the output unit 7, so that the recognition results are, for example, displayed on the display unit (the output unit 7).

Figure 2:
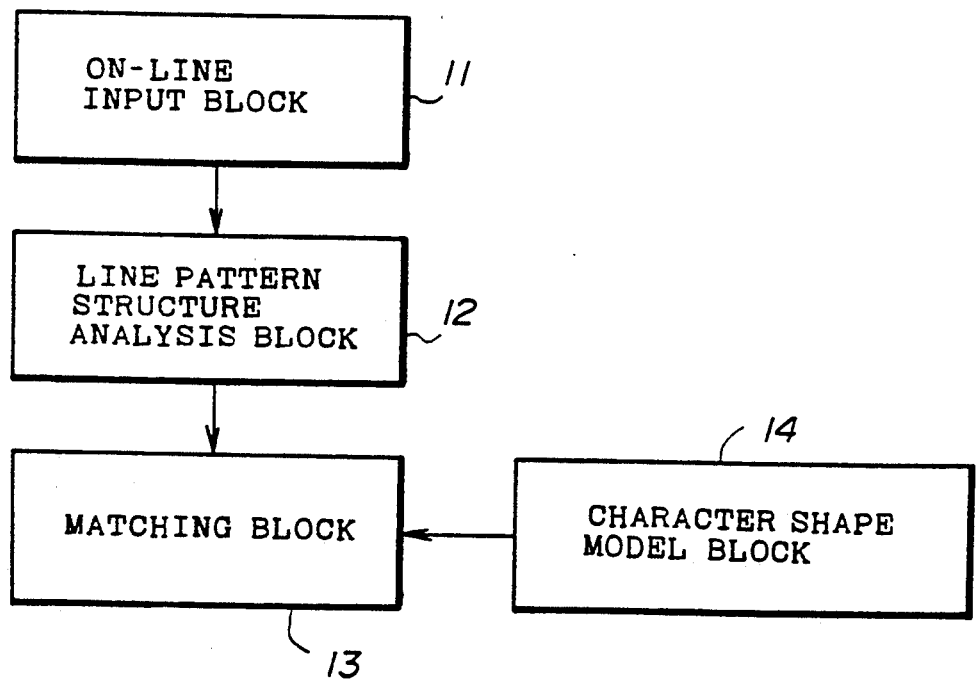
FIG. 2 is a block diagram illustrating fundamental functions of the on-line handwriting recognition system provided in the character recognition system shown in FIG. 1.

FIG. 2 shows fundamental functions of the on-line handwriting recognition system provided in the character recognition system shown in FIG. 1. Referring to FIG. 2, an on-line input block 11 is formed in the digitizing tablet (the input unit 5) shown in FIG. 1. The on-line input block 11 outputs stroke information, such as the coordinate data of the sampled points on strokes of the character which is written by the operator, in time series. A character input to the on-line input block 11 is referred to as an on-line input character. A line pattern structure analysis block 12 and a matching block 13 are respectively formed in the CPU 1 shown in FIG. 1. A character shape model block 14 is formed in the ROM 2 or the RAM 3. The line pattern structure analysis block 12 analyzes a line pattern structure of the on-line input character based on the stroke information supplied from the on-line input block 11. The line pattern structure analysis block 12 extracts features describing a general structure of the on-line input character which do not depend on the writing stroke order of the on-line input character. A standard model (a dictionary) of each character shape is previously recorded in the character shape model block 14. The matching block 13 carries out a matching of the features obtained by the line pattern structure analysis block 12 and the standard model of each character shape recorded in the character shape model block 14. The matching block 13 outputs recognition results of the on-line characters obtained in accordance with the matching process.

A detailed description will now be given of the line pattern structure analysis block 12, the matching block 13 and the character shape model block 14.

The Line Pattern Structure Analysis Block 12

Figure 4:
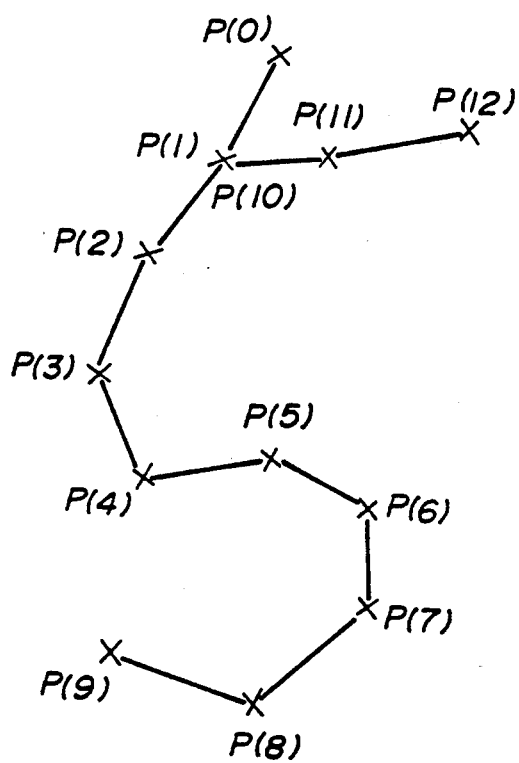
FIG. 4 is a diagram illustrating an example of the on-line input character.

While an operator is writing a character on the on-line input block 11 (the digitizing tablet), the on-line input block 11 samples points on lines of the character at a predetermined time rate. That is, the stroke information output from the on-line input block 11 is formed of coordinate data of sampled points P on strokes of the on-line input character. Each stroke is described by a curve formed of one or a plurality of line segments, each segment connecting adjacent sampled points to each other, as shown in FIG. 4. The sampled points P are sequentially output from the on-line input block 11. While an operator is inputting (writing), for example, a numerical character "5" to the on-line input block 11, as shown in FIG. 4, the on-line input block 11 successively outputs stroke information of sampled points $P(0)$ through $P(12)$ in this order.

Figure 3:
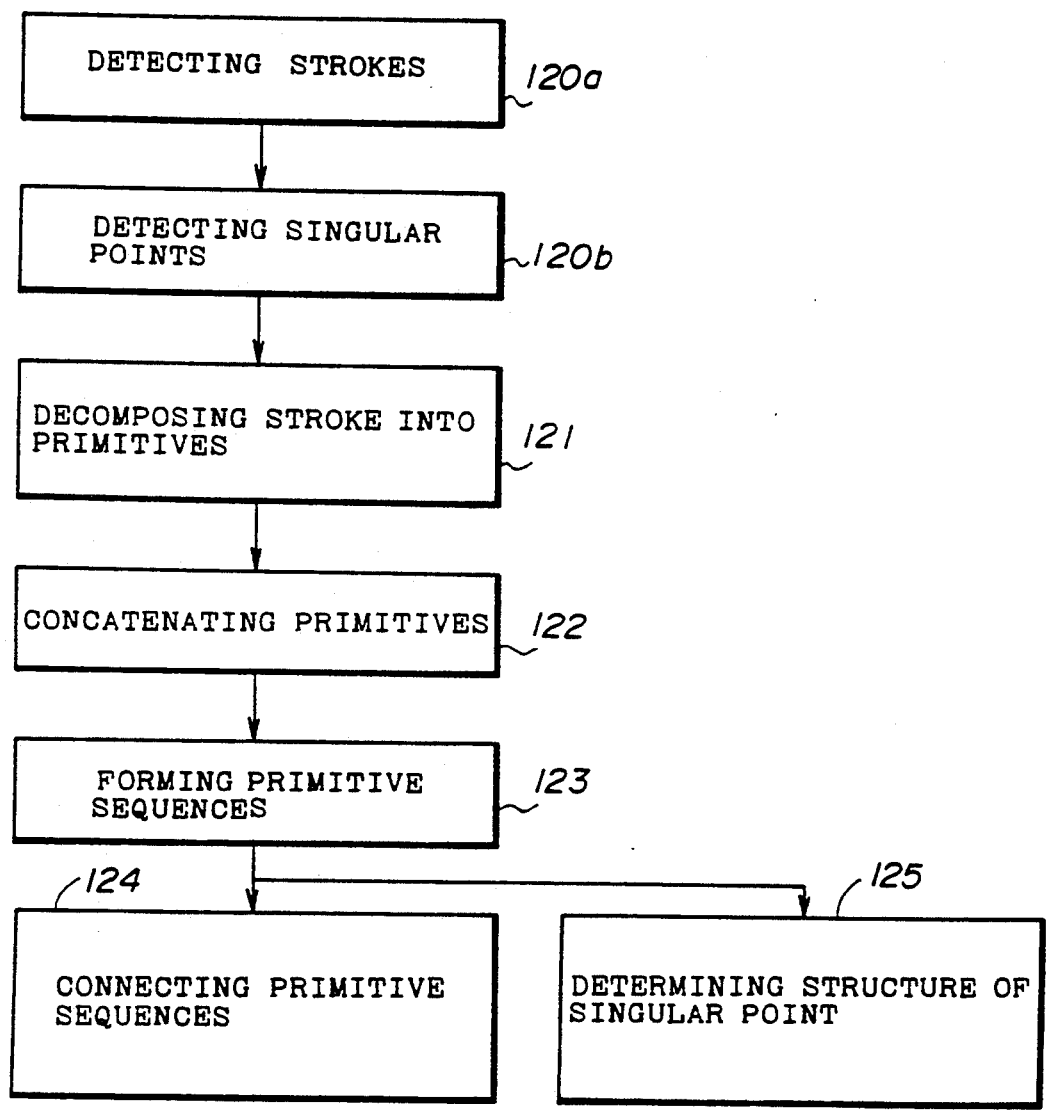
FIG. 3 is a flow chart illustrating a process for recognizing an on-line input character.

The line pattern structure analysis block 12, to which the stroke information of the above sampled points $P(0)$ through $P(12)$ shown in FIG. 4 is supplied, carries out a process in accordance with a flow chart shown in FIG. 3.

(i) DETECTING STROKES (step 120a)

Step 120a detects strokes of the on-line input character input to the on-line input block 11 based on the sampled points $P(0)$ through $P(12)$ shown in FIG. 4. In this case, a pen for writing characters is separated from the digitizing tablet between sampled points $P(9)$ and $P(10)$, so that step 120a determines that a line pattern of the on-line input character is divided into two strokes, a first stroke connecting sampled points $P(0)$ through $P(9)$ and a second stroke connecting sampled points $P(10)$ through $P(12)$. That is, the first and second strokes are detected in step 120a.

(ii) DETECTING SINGULAR POINTS (step 120b)

Step 120b detects one or a plurality of singular points based on the sampled points $P(0)$ through $P(12)$ supplied from the on-line input block 11.

A singular point is defined as a pair of points on each stroke of the on-line input character, which points are written at different times and have substantially the same coordinates as each other. The singular point is detected in the following four cases.

A first case is indicated in FIG. 5(a). In FIG. 5(a), a line segment connecting sampled points $p_1$ and $p_2$ and another line segment connecting sampling points $q_1$ and $q_2$ are crossed in a state where the coordinates of the sampled points $p_1$ and $q_1$ are equal to each other. In this case, a pair of sampled points $p_1$ and $q_1$ is detected as the singular point. The above sampled points $p_1$, $p_2$, $q_1$ and $q_2$ can be an end point of each stroke and an inner point thereof.

A second case is indicated in FIG. 5(b). In FIG. 5(b), a line segment correcting sampled points $p_1$ and $p_2$ and another line segment connecting sampled points $q_1$ and $q_2$ are crossed in a state where the coordinates of an inner point of the line segment connecting the sampled points $p_1$ and $p_2$ and the coordinates of the sampled point $q_1$ are equal to each other. In this case, a pair of points comprising a point $p_0$ and the sampled point $q_1$ is detected as the singular point. The point $p_0$ is the closest point to the sampled point $q_1$ between the sampled points $p_1$ and $p_2$. The sampled point $q_1$ can be an end point of the stroke and an inner point thereof.

A third case is indicated in FIG. 5(c). In points $p_1$ and $p_2$ and another line segment connecting the sampled points $q_1$ and $q_2$ are crossed in a state where the coordinates of an inner point of the line segment connecting the sampled points $p_1$ and $p_2$ and the coordinates of an inner point of the line segment connecting the sampled points $q_1$ and $q_2$ are equal to each other. In this case, four pairs of sampled points $(p_1, q_1)$, $(p_1, q_2)$, $(p_2, q_1)$ and $(p_2, q_2)$ are formed, and then a distance between the sampled points in each pair is calculated. A pair of sampled points having a distance therebetween which is the smallest distance is detected as the singular point.

A fourth case is indicated in FIG. 5(d). In FIG. 5(d), the sampled point $q_1$ is positioned in a detection area A which is formed based on the dimension of a line segment connecting the sampled points $p_1$ and $p_2$. The detection area A is defined, for example, as a rectangular area having a width of 2d and a height equal to the length of the line segment connecting $p_1$ and $p_2$ where d is a predetermined threshold distance. The line segment connecting $p_1$ and $p_2$ is positioned at the center of the detection area A in a width direction thereof. In this case, a pair of points comprising a point $p_0$ and the sampled point $q_1$ is detected as the singular point. The point $p_0$ is the closest point to the sampled point $q_1$ between the sampled points $p_1$ and $p_2$. In addition, as another sampled point $q_3$ is also positioned in the detection area, a pair of a point $p_0$, which is the closest point to the sampled point $q_3$ between the sampled points $p_1$ and $p_2$, and the sampled point $q_3$ is detected as the singular point.

In a case shown in FIG. 4, the sampled points $P(1)$ and $P(10)$ are written at different time and have the same coordinates. Thus, a pair of sampled points ($P(1)$ and $P(10)$) is detected as the singular point in accordance with the above first case shown in FIG. 5(a).

(iii) DECOMPOSING STROKE INTO PRIMITIVES (step 121)

Each stroke detected in step 120a is decomposed into primitives.

An xy-monotone curve is a curve whose x coordinate and y coordinate values are always either non-increasing or non-decreasing when the curve is being traced. Coordinates of both end points of an xy-monotone curve are defined as $P(x_0, y_0)$ and $Q(x_1, y_1)$, where $x_0 < x_1$ and $y_0 < y_1$ if $x_0 = x_1$. In this case, the point P is referred to as a "head" of the curve and the point Q is referred to as a "tail" of the curve. The xy-monotone curve is classified into the following four types of curves.

(1) First type

The first type of xy-monotone curve is a horizontal line ($y_0 = y_1$) which is symbolized by "—". The first type of xy-monotone curve is indicated in FIG. 6(a).

(2) Second type

The second type of xy-monotone curve is a curve which increases in a right direction and decreases in a left direction $[(x_0 - x_1) \times (y_0 - y_1) > 0]$. The second type of xy-monotone curve is indicated in FIG. 6(b) and symbolized by "/".

(3) Third type

The third type of xy-monotone curve is a vertical line ($x_0 = x_1$) which is symbolized by "|". The third type of xy-monotone curve is indicated in FIG. 6(c).

(4) Fourth type

The fourth type of xy-monotone curve is a curve which decreases in a right direction and increases in a left direction $[(x_0 - x_1) \times (y_0 - y_1) < 0]$. The fourth type of xy-monotone curve is indicated in FIG. 6(d) and symbolized by "\".

Each of the above types of xy-monotone curves is referred to as a primitive. That is, the primitive is a simple curve element.

Figure 7:
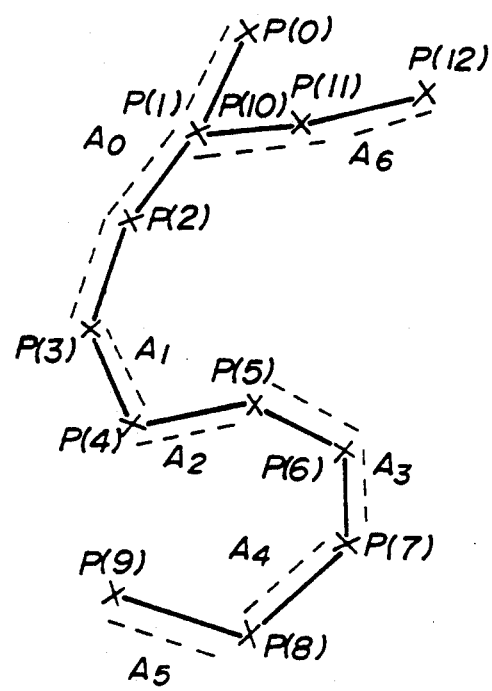
FIG. 7 is a diagram illustrating primitives on strokes forming the on-line input character shown in FIG. 4.

In the case shown in FIG. 4, the first stroke ($P(0), P(1), \ldots,$ and $P(9)$) and the second stroke ($P(10), P(11)$ and $P(12)$) are respectively decomposed into primitives $A_0$ through $A_6$, each of which belongs to one of the above types of xy-monotone curves, as shown in FIG. 7. That is, the first stroke is decomposed into the following primitives $A_0$ through $A_5$.

$A_0(/):(P(0), P(1), P(2)$ and $P(3))$
$A_1(\backslash):(P(3)$ and $P(4))$
$A_2(/):(P(4)$ and $P(5))$
$A_3(\backslash):(P(5), P(6)$ and $P(7))$
$A_4(/):(P(7)$ and $P(8))$
$A_5(\backslash):(P(8)$ and $P(9))$ The second stroke is decomposed into a primitive $A_6$.

$A_6(/):(P(10), P(11)$ and $P(12))$ (iv) CONCATENATING PRIMITIVES (step 122)

The primitives obtained in step 121 are concatenated in accordance with predetermined concatenating rules.

It is assumed that two xy-monotone curve (primitives) a and b which belong to different types of xy-monotone curves form a curve which is not an xy-monotone curve and the xy-monotone curves a and b are not included in each other. A point P is positioned on both of the xy-monotone curves a and b, and points Q and R are positioned adjacent to the point P. The point Q is included in the xy-monotone curve a only and the point R is included in the xy-monotone curve b only. In this case, it is assumed that a vector product of a vector $(x_q - x_p, y_q - y_p)$ and a vector $(x_r - x_p, y_r - y_p)$ is greater than zero, $(x_q - x_p) \times (y_r - y_p) - (x_r - x_p) \times (y_q - y_p) > 0$, where coordinate data o the point P is $coor(P) = (x_p, y_p)$, coordinate data of the point Q is $coor(Q) = (x_q, y_q)$, and coordinate data of the point R is $coor(R) = (x_r, y_r)$.

In the assumption described above, when the concatenations of two primitives a and b are indicated by $$\overset{j}{a \rightarrow b}$$

$j = 0, 1, 2, 3,$ the concatenations of the primitives a and b are defined as follows.

In a case where A and B are one of the types of "/", "\", "|" and "—" and $\alpha$ and $\beta$ are either the "head" or the "tail", a symbol $[A, \alpha, B, \beta]$ represents that the primitive a of a type A and the primitive b of a type B are concatenated with each other at $\alpha$ of the primitive a and $\beta$ of the primitive b.

(Rule 1)

The concatenations represented by $[\backslash, \text{head}, /, \text{tail}]$, $[\backslash, \text{head}, —, \text{tail}]$, $[—, \text{head}, /, \text{head}]$, and $[\backslash, \text{head}, \backslash, \text{head}]$ are respectively defined as $$\overset{0}{a \rightarrow b} \quad \text{(downward convexity)}$$

(Rule 2)

The concatenations represented by [\, head, /, head], [\, head, —, head], [—, head, /, head], and [\, head, \, head] are respectively defined as $$a \xrightarrow{1} b \quad \text{(leftward convexity)}$$

(Rule 3)

The concatenations represented by [/, tail, \, head], [/, tail, |, tail], [|, tail, \, head], and [/, tail, /, tail] are respectively defined as $$a \xrightarrow{2} b \quad \text{(upward convexity)}$$

(Rule 4)

The concatenations represented by [\, tail, /, tail], [\, tail, —, tail], [—, tail, /, tail], and [\, tail, \, tail] are respectively defined as $$a \xrightarrow{3} b \quad \text{(right convexity)}$$

Figure 8:
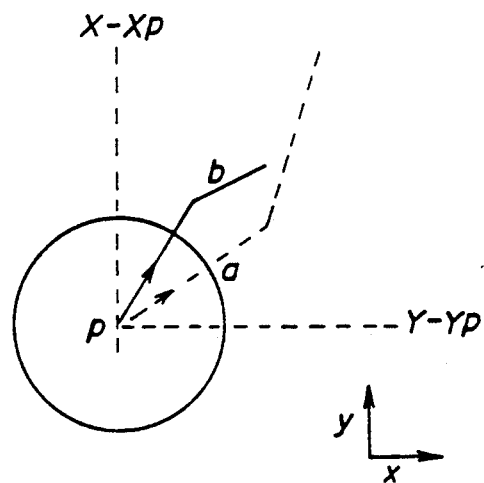
FIG. 8 is a diagram illustrating a concatenation of the primitives.

FIG. 8 shows the concatenation of two primitives. Referring to FIG. 8, two primitives a and b are concatenated so that a pair of vectors ($\vec{PP_a}$, $\vec{PP_b}$) is in a right-handed system, where P is a point in an intersection of the primitives a and b, and $P_a$ and $P_b$ are respectively points on the primitives a and b. $P_a$ corresponds to Q described above and $P_b$ corresponds to R described above. In this case, the concatenation of primitives a and b is denoted by the above symbol $$a \xrightarrow{j} b.$$

Figure 9A:
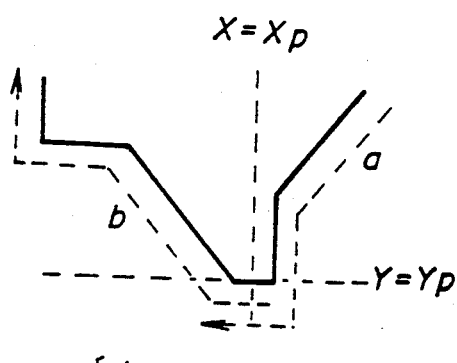
FIG. 9a-9d, 10a-10d, 11a-11d and 12a-12d are diagrams illustrating types of concatenation of the primitives.
Figure 9B:
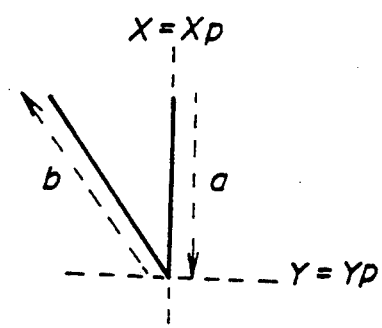
Figure 9C:
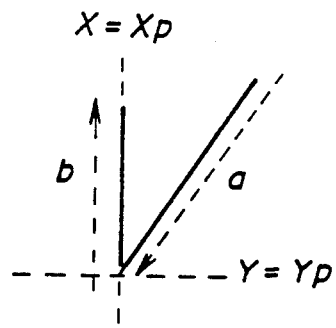

FIGS. 9(a), (b), (c) and (d) show the primitives a and b which are concatenated in accordance with the Rule 1

$$(a \xrightarrow{0} b).$$

Figure 10A:
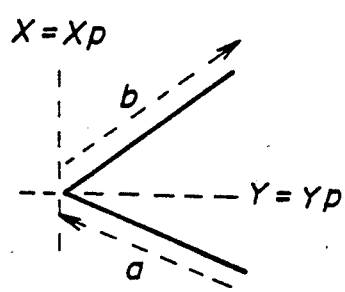
Figure 10B:
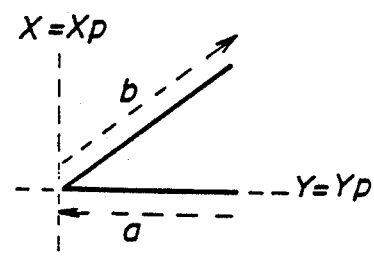
Figure 10C:
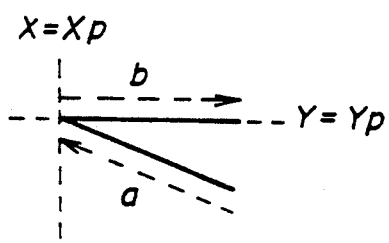
Figure 10D:
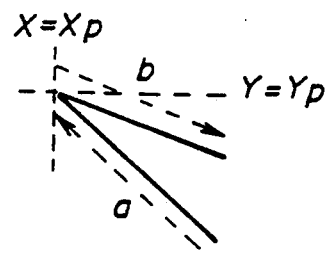
Figure 11A:
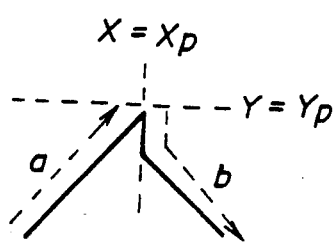
Figure 11B:
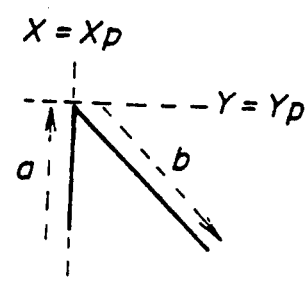
Figure 11C:
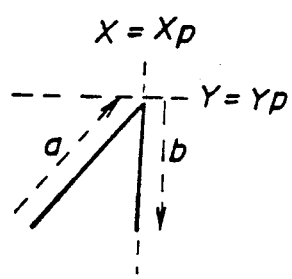
Figure 11D:
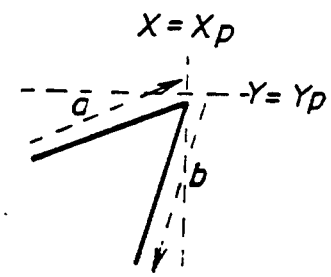

FIGS. 10(a), (b), (c) and (d) show the primitives a and b which are concatenated in accordance with the Rule 2

$$(a \xrightarrow{1} b).$$

FIGS. 11 (a), (b), (c) and (d) show the primitives a and b which are concatenated in accordance with the Rule 3

$$(a \xrightarrow{2} b).$$

FIGS. 12 (a), (b), (c) and (d) show the primitives a and b which are concatenated in accordance with the Rule 4

$$(a \xrightarrow{3} b).$$

In a case where each stoke of the on-line input character is decomposed into the primitives as shown in FIG. 7, the following concatenations of primitives are obtained in step 122.

$$A_1 \xrightarrow{1} A_0, A_2 \xrightarrow{0} A_1,$$

$$A_2 \xrightarrow{2} A_3, A_3 \xrightarrow{3} A_4, A_4 \xrightarrow{0} A_5$$

(v) FORMING PRIMITIVE SEQUENCES (step 123)

A plurality of concatenations of primitives which are obtained in step 122 are linked together, so that the following primitive sequence can be generated.

$$a_0 \xrightarrow{j_1} a_1 \xrightarrow{j_2} a_2 \xrightarrow{} \ldots a_{n-1} \xrightarrow{j_n} a_n \quad (1)$$

In a case shown in FIG. 7, when the concatenations primitives forming the first stroke (P(0), P(1), ..., and P(9)) are linked together, the following two primitive sequences $E_0$ and $E_1$ are obtained.

$$E_0: A_2 \xrightarrow{0} A_1 \xrightarrow{1} A_0$$

$$E_1: A_2 \xrightarrow{2} A_3 \xrightarrow{3} A_4 \xrightarrow{0} A_5$$

The second stroke (P(10), P(11), and P(12)) is formed of only one primitive $A_6$, so that the primitive sequence $E_2$ including only the primitive $A_6$ is obtained.

$E_2: A_6$

A label $<ps, id>$ is given to each primitive sequence indicated by the above formula (1). A first factor ps and a second factor id of the label are respectively defined as follows.

$$ps = \sum_{i=1}^{n-1} [(j_{i+1} - j_i)(mod\,4)] + \text{corner}(a_{n-1} \xrightarrow{j_n} a_n)$$

$$id = j_1$$

where corner $$(a_{n-1} \to a_n)$$

is a function which has a value of "1" when the primitives a and b are the same type and has a value of "0" when the primitives a and b are different types.

Figure 9D:
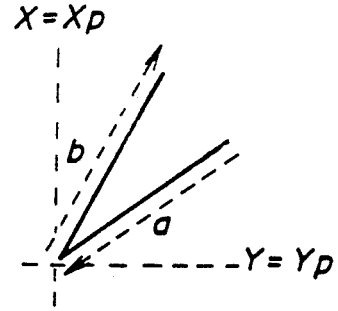

The second factor id of the label <ps,id> indicates an initial direction in which a concave curve defined by the primitive sequence is extended. In the first factor ps of the label <ps,id>, a first term, $$\sum_{i=1}^{n-1} [(j_{i+1} - j_i)(\bmod 4)]$$

corresponds to a difference between directions in the concave curve, so that the first term represents a number of rotations of the concave curve. A second term of the first factor ps, $$\text{corner} \, \frac{j_n}{(a_{n-1} \to a_n)}$$

is a correction term which is effectively used in a case where a concatenation of primitives shown in FIG.9(d), FIG. 10(d), FIG. 11(d) or FIG. 12(d) is provided at an end of a primitive sequence. For example, if a downward concavity and a leftward concavity are superposed on each other, the concatenation of primitives shown in FIG. 9(d) is obtained.

Hence, the primitive sequences $E_0$ and $E_1$ forming the first stroke of the above on-line <3,0> and <4,2>.

(vi) CONNECTING PRIMITIVE SEQUENCES (step 124)

Figure 13:
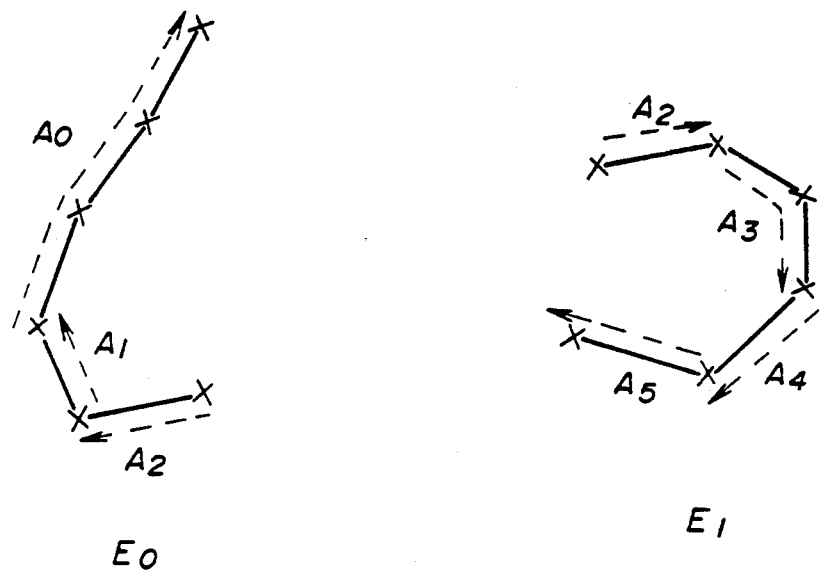
FIG. 13 is diagram illustrating primitive sequences forming a first stroke of the on-line input character shown in FIG. 4.

The primitive sequences $E_0$ and $E_1$ shown in FIG. 13 have a common primitive $A_2$ which is positioned at an end of each primitive sequence. There are two types of connections between two primitive sequences. In the first type of connection, the primitive sequences are connected to each other in a state where the same primitive is positioned at a leading end of each primitive sequence, as shown the above example in FIG. 13. In the second type of connection, the primitive sequences are connected to each other in a state where the same primitive is positioned at a tail end of each primitive sequence. The first type of connection is referred to as an h-connection, and the second type of connection is referred to as a t-connection. For example, the primitives $E_0$ and $E_1$ are connected to each other in the form of the h-connection. This condition is represented by $$E_0 \overset{h}{-} E_1.$$

In the case of the t-connection, t is substituted for h in the above representation.

(vii) DETERMINING STRUCTURE OF SINGULAR POINT (step 125)

Figure 12A:
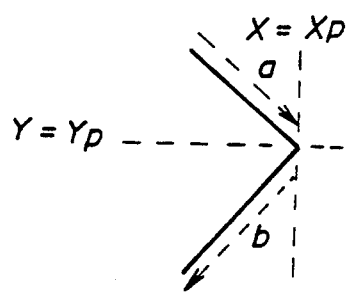
Figure 12B:
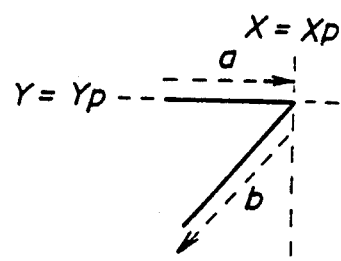
Figure 12C:
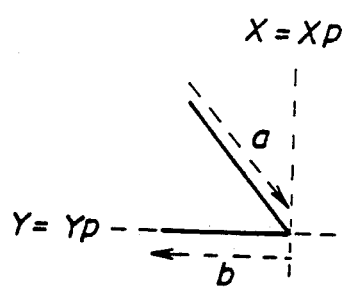
Figure 12D:
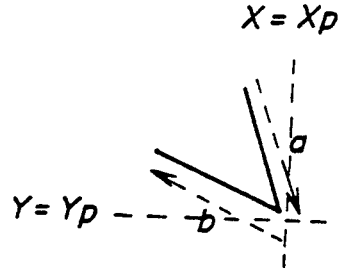
Figure 14A:
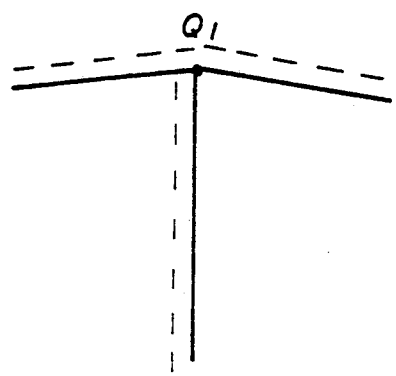
FIGS. 14a-14d are diagrams illustrating types of singular points.
Figure 14B:
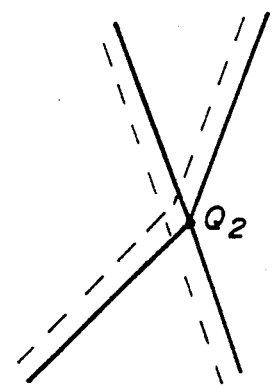
Figure 14C:
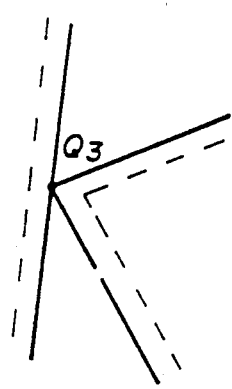
Figure 14D:
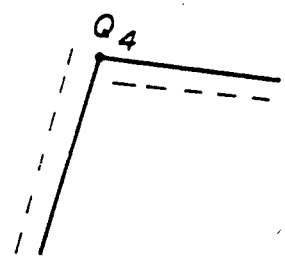

A structure of each singular point obtained in step 120b is determined. Each singular point is classified as being one of four singular point types shown in FIG. 14(a), (b), (c) and (d). A first type shown in FIG. 14(a) is referred to as a T-type. In the T-type, two line segments are coupled to each other at a singular point $Q_1$ to form a T-shape. A second type shown in FIG. 14(b) is referred to as an X-type. In the X-type, two line segments are crossed at a singular point $Q_2$ to form a X-shape. A third type shown in FIG. 14(c) is referred to as a K-type. In the K-type, three line segments are coupled to each other at a singular point $Q_3$ to form a K-shape. A fourth type shown in FIG. 12(d) is referred to as an L-type. In the L-type, two line segments are coupled to each other at a singular point $Q_4$ which is positioned at an end of each line segment to form an L-shape. The structure of each singular point is described by two primitive sequences, each of which includes a singular point and the type of singular point it is.

In the case of the on-line character shown in FIG. 7, the singular point (P(1) and P(10)) belongs to the T-type and is positioned on the primitives $A_0$ and $A_6$ which are respectively in the primitive sequences $E_0$ and $E_1$. Thus, the structure of the singular point (P(1) and P(10)) is described by the following symbol;

$$(E_0 \, T \, E_1).$$

According to the process described above, the structure of the on-line input character shown in FIG. 4 can be described as follows. That is, the following structural description of a character shape is obtained First stroke (P(0), P(1), . . . , and P(9)):$E_0$<3,-0> $E_1$<4,2>

Second stroke (P(10), P(11), and P(12)):$E_2$ "/"

Singular point (P(1) and P(10)):$(E_p \, T \, E_2)$

The Matching Block 13 and the Character Shape Model Block 14

The standard model recorded in the character shape model block 14 is formed of the structural description of standard character shapes which are previously obtained in the same manner as that described above. The matching block 13 carries out the matching between the structural description of the on-line input character which is output from the line pattern structure analysis block 12 and the structural description of standard character shapes from the character shape model block 14, so that the matching block 13 outputs a recognition result regarding the on-line input character which is input to the on-line input block 11.

A result in the matching process only depends on the primitive sequences forming the strokes, the connection of primitive sequences and the structure of the singular point which has been described above. The result in the matching process does not depend on the writing stroke order, a direction in which each stroke extends, such as a direction from left to right and a direction from up to down.

Figure 15:
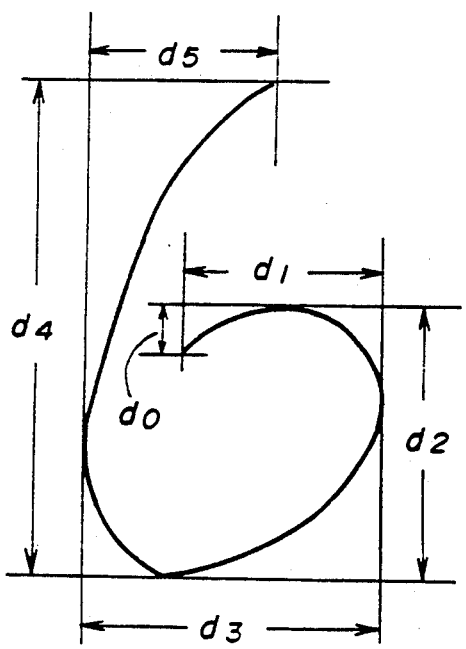
FIG. 15 is a diagram illustrating another example of the on-line input character.

A curve shown in FIG. 15 has a label <5,2>. This curve can be matched to the character "0" and "6" in accordance the shape of the curve. In a case like this, a detailed recognition of the curve can be performed by applying a statistical analyzing technique to parameter vectors describing the shape of the curve. For example, in the curve shown in FIG. 15, it can be recognized whether the curve is either a character "0" or "6" by applying a linear discrimination analysis to a vector $(d_1/d, d_2/d, \ldots, d_5)$ where d is defined as the following formula.

$$d = \sum_{i=0}^{5} d_i$$

The present invention is not limited to the aforementioned embodiments, and variations and modifications may be made without departing from the scope of the claimed invention.

What is claimed is:

1. A method for extracting features from a character which is input to an on-line input means by writing the character by hand, said on-line input means successively outputting stroke information indicating points on strokes of the handwritten character, said method comprising the steps of:
   (a) detecting strokes of the handwritten character based on the stroke information output from said on-line input means;
   (b) detecting singular points from the points on the strokes of the handwritten character based on the stroke information output from said on-line input means, wherein each of said singular points is defined as a pair of points on the strokes of the handwritten character, which points are written at different times but have substantially the same coordinates as each other;
   (c) obtaining primitive sequences forming each of said strokes detected by said step (a), each of said primitive sequences is formed of primitives, each primitive of which is a monotone curve which is either non-increasing or non-decreasing;
   (d) determining a connective relationship between primitive sequences of each of the strokes; and
   (e) determining a structure of each of the singular points detected by said step (b) based on:
      (1) primitive sequences including said each of the singular points; and
      (2) a coupling of the primitive sequences including said each of the singular points;
   wherein:
   A) said on-line input means includes:
      1) means for sampling points on the strokes of the handwritten character at a predetermined time rate; and
      2) means for outputting the sampled point as the stroke information;
   B) said step (b) includes (b-1) detecting the singular points based on a location of: (i) a first line segment connecting sampled points $p_1$ and $p_2$ and (ii) a second line segment connecting sampled points $q_1$ and $q_2$; and
   C) said step (b-1) includes detecting a pair of the sampled points $p_1$ and $q_1$ as one of the singular points when the first and second line segments are crossed in a state in which coordinates of the sampled points $p_1$ and $q_1$ are equal to each other.

2. A method for extracting features from a character which is input to an on-line input means by writing the character by hand, said on-line input means successively outputting stroke information indicating points on strokes of the handwritten character, said method comprising the steps of:
   (a) detecting strokes of the handwritten character based on the stroke information output from said on-line input means;
   (b) detecting singular points from the points on the strokes of the handwritten character based on the stroke information output from said on-line input means, wherein each of said singular points is defined as a pair of points on the strokes of the handwritten character, which points are written at different times but have substantially the same coordinates as each other;
   (c) obtaining primitive sequences forming each of said strokes detected by said step (a), wherein each of said primitive sequences is formed of primitives, each primitive of which is a monotone curve which is either non-increasing or non-decreasing;
   (d) determining a connective relationship between primitive sequences of each of the strokes; and
   (e) determining a structure of each of the singular points detected by said step (b) based on:
      (1) primitive sequences including said each of the singular points; and
      (2) a coupling of the primitive sequences including said each of the singular points;
   wherein:
   A) said on-line input means includes:
      1) means for sampling points on the strokes of the handwritten character at a predetermined time rate; and
      2) means for outputting the sampled point as the stroke information;
   B) said step (b) includes (b-1) detecting the singular points based on a location of: (i) a first line segment connecting sampled points $p_1$ and $p_2$ and (ii) a second line segment connecting sampled points $q_1$ and $q_2$; and
   C) said step (b-1) includes detecting a pair of points including a point $p_0$ and the sampled point $q_1$ as one of the singular points when the first and second line segments are crossed in a state where coordinates of the non-end point of the first line segment and the sampled point $q_1$ are equal to each other, said point $p_0$ being the closest point to the sampled point $q_1$ between the sampled points $p_1$ and $p_2$.

3. A method for extracting features from a character which is input to an on-line input means by writing the character by hand, said on-line input means successively outputting stroke information indicating points on strokes of the handwritten character, said method comprising the steps of:
   (a) detecting strokes of the handwritten character based on the stroke information output from said on-line input means;
   (b) detecting singular points from the points on the strokes of the handwritten character based on the stroke information output from said on-line input means, wherein each of said singular points is defined as a pair of points on the strokes of the handwritten character, which points are written at different times but have substantially the same coordinates as each other;
   (c) obtaining primitive sequences forming each of said strokes detected by said step (a), wherein each of said primitive sequences is formed of primitives, each primitive of which is a monotone curve which is either non-increasing or non-decreasing;
   (d) determining a connective relationship between primitive sequences of each of the strokes; and
   (e) determining a structure of each of the singular points detected by said step (b) based on:
      (1) primitive sequences including said each of the singular points; and
      (2) a coupling of the primitive sequences including said each of the singular points;
   wherein:
   A) said on-line input means includes:

1) means for sampling points on the strokes of the handwritten character at a predetermined time rate; and
2) means for outputting the sampled point as the stroke information;

B) said step (b) includes (b-1) detecting the singular points based on a location of: (i) a first line segment connecting sampled points $p_1$ and $p_2$ and (ii) a second line segment connecting sampled points $q_1$ and $q_2$; and C) said step (b-1) includes detecting one of four pairs of the sampled points $(p_1,p_1)$, $(p_1,q_2)$, $(p_2,q_1)$ and $(p_2,q_2)$ as one of the singular point when the first and second line segments are crossed in a state where coordinates of non-end points of the first and second line segments are equal to each other, said one of the four pairs of samples points having the smallest distance between the sampled points.

4. A method for extracting features from a character which is input to an on-line input means by writing the character by hand, said on-line input means successively outputting stroke information indicating points on strokes of the handwritten character, said method comprising the steps of:

(a) detecting strokes of the handwritten character based on the stroke information output from said on-line input means;

(b) detecting singular points from the points on the strokes of the handwritten character based on the stroke information output from said on-line input means, wherein each of said singular points is defined as a pair of points on the strokes of the handwritten character, which points are written at different times but have substantially the same coordinates as each other;

(c) obtaining primitive sequences forming each of said strokes detected by said step (a), each of said primitive sequences is formed of primitives, each primitive of which is a monotone curve which is either non-increasing or non-decreasing;

(d) determining a connective relationship between primitive sequences of each of the strokes; and (e) determining a structure of each of the singular points detected by said step (b) based on:
   (1) primitive sequences including said each of the singular points; and
   (2) a coupling of the primitive sequences including said each of the singular points;

wherein:

A) said on-line input means includes:
  1) means for sampling points on the strokes of the handwritten character at a predetermined time rate; and
  2) means for outputting the sampled point as the stroke information;

B) said step (b) includes (b-1) detecting the singular points based on a location of: (i) a first line segment connecting sampled points $p_1$ and $p_2$ and (ii) a second line segment connecting sampled points $q_1$ and $q_2$; and C) said step (b-1) includes detecting a pair of points comprising a point $p_0$ and the sampled point $q_1$ as one of the singular points when the sampled point $q_1$ is included in a detection area which is formed based on a dimension of the first line segment, said point $p_0$ being the closest point to the sampled point $q_1$ between the sampled points $p_1$ and $p_2$.

* * * * *